(12) United States Patent
Pfaendner et al.

(10) Patent No.: US 6,569,926 B1
(45) Date of Patent: May 27, 2003

(54) POLYMER COMPOUND WITH IMPROVED GLOSS PROPERTIES

(75) Inventors: Rudolf Pfaendner, Rimbach (DE); Kornelia Malzacher, Lindenfels (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/786,732

(22) PCT Filed: Sep. 1, 1999

(86) PCT No.: PCT/EP99/06395

§ 371 (c)(1),
(2), (4) Date: Mar. 8, 2001

(87) PCT Pub. No.: WO00/15708

PCT Pub. Date: Mar. 23, 2000

(30) Foreign Application Priority Data

Sep. 11, 1998 (EP) ................................. 98810909

(51) Int. Cl.⁷ ..................... C08K 5/3445; C08L 101/00
(52) U.S. Cl. ..................... 524/106; 524/105; 524/109; 524/114; 524/567; 524/570; 524/583; 524/585
(58) Field of Search ................. 524/105, 106, 524/109, 114, 567, 570, 583, 585

(56) References Cited

U.S. PATENT DOCUMENTS 3,530,095 A   9/1970   Porret .......................... 260/47

FOREIGN PATENT DOCUMENTS

| DE | 1906515 | 10/1969 | |
| GB | 942619 | 11/1963 | |
| GB | 0942619-a | * 11/1963 | |
| GB | 1049100 | 11/1966 | |
| GB | 1136594 | 12/1968 | |
| GB | 1136594 A | * 12/1968 | ............ C09D/7/12 |

OTHER PUBLICATIONS

Patent Abstracts of Japan, vol. 018, No. 114 (1994) for JP 05306352.

Patent Abstracts of Japan vol. 017, No. 458 (1993) for JP 05105731.

* cited by examiner

Primary Examiner—Kelechi Egwim
(74) Attorney, Agent, or Firm—Tyler A. Stevenson; David R. Crichton

(57) ABSTRACT

A polymer composition comprising a) a thermoplastic polymer, b) a polyfunctional epoxy compound and c) an imidazolidone compound. The invention relates also to a method of improving the gloss of such polymers, to the polymers themselves with improved gloss, and also to the use of polyfunctional epoxy compounds and imidazolidones for improving gloss.

15 Claims, No Drawings

POLYMER COMPOUND WITH IMPROVED GLOSS PROPERTIES

The present invention relates to a polymer composition comprising a) a thermoplastic polymer, b) a polyfunctional epoxy compound and c) an imidazolidone compound. The invention relates also to a method of improving the gloss of such polymers, to the polymers themselves with improved gloss, and to the use of polyfunctional epoxy compounds and imidazolidones for improving gloss.

Uniformly glossy surfaces are a frequently desired property for the user/consumer because they both repel dirt better and give the product a more aesthetically pleasing appearance. A number of thermoplastics, such as polyolefins and polyvinyl chloride (PVC), that have been produced using alternative processing stabilisers, for example calcium and zinc stabilisers, and also recycled plastics materials, however, frequently have a low surface gloss.

The problem underlying the present invention is accordingly to provide gloss-improving compositions for thermoplastic polymers, especially polyolefins, for alternatively stabilised, halogen-containing polymers or recycled plastics materials, which compositions do not have an adverse effect on the thermal and weathering properties of those polymers.

Within the scope of the present invention, "alternative stabilisation of halogen-containing polymers" is to be understood as meaning that no lead, cadmium, barium or tin stabilisors are used.

In order to avoid barium-, lead- or cadmium-containing compounds, calcium/zinc soaps, for example, have been proposed; see in that connection, for example, "Taschenbuch der Kunststoff-Additive", editors R. Gächter and H. Müller, (abbreviated hereinafter to "KA'e G&M") Hanser Verlag, 3rd Edition, 1990, pages 308–309 and Kunststoff Handbuch PVC, Volumes 1 and 2, Beck/Braun, Carl Hanser Verlag, 2nd Edition, 1985/1986.

Surprisingly, it has been found that the above-mentioned problem is solved by the addition of at least one polyfunctional epoxy compound and at least one imidazolidone compound.

The present invention accordingly relates to a polymer composition comprising
 a) a thermoplastic polymer,
 b) at least one polyfunctional epoxy compound and
 c) at least one imidazolidone compound.

The thermoplastic polymers may be in the form of virgin polymers or recycled materials. Within the scope of the present invention "recycled materials" is to be understood as both production scrap that is reprocessed and scrap polymer that is obtained from collected goods.

Suitable thermoplastic polymers are listed hereinbelow.
1. Polymers of mono- and di-olefins, for example polypropylene, polyisobutylene, polybutene-1, poly-4-methylpentene-1, polyisoprene or polybutadiene and also polymers of cycloolefins, e.g. of cyclopentene or norbornene; also polyethylene (which may optionally be crosslinked), e.g. high-density polyethylene (HDPE), high molecular weight high density polyethylene (HDPE-HMW), ultrahigh molecular weight high-density polyethylene (HDPE-UHMW), medium-density polyethylene (MDPE), low-density polyethylene (LDPE), linear low-density polyethylene (LLDPE), (VLDPE) and (ULDPE).

Polyolefins, that is to say polymers of monoolefins, as mentioned by way of example in the above paragraph, especially polyethylene and polypropylene, can be prepared according to various processes, especially using the following methods:

a) free-radically (usually at high pressure and high temperature).
 b) by means of a catalyst, the catalyst usually containing one or more metals from group IVb, Vb, VIb or VIII. Such metals generally have one or more ligands, such as oxides, halides, alcoholates, esters, ethers, amines, alkyls, alkenyls and/or aryls, that may be either π- or σ-coordinated. Such metal complexes may be free or supported on carriers, for example on activated magnesium chloride, titanium(III) chloride, aluminium oxide or silicon oxide. The catalysts may be soluble or insoluble in the polymerisation medium. The catalysts may be active on their own in the polymerisation, or further activators may be used, such as, for example, metal alkyls, metal hydrides, metal alkyl halides, metal alkyl oxides or metal alkyl oxanes, the metals being elements from group(s) Ia, IIa and/or IIIa. The activators may be modified, for example, with further ester, ether, amine or silyl ether groups. Such catalyst systems are usually termed Phillips, Standard Oil Indiana, Ziegler (-Natta), TNZ (DuPont), metallocene or single site catalysts (SSC).
2. Mixtures of the polymers mentioned under 1), for example mixtures of polypropylene with polyisobutylene, polypropylene with polyethylene (e.g. PP/HDPE, PP/LDPE) and mixtures of different types of polyethylene (e.g. LDPE/HDPE).
3. Copolymers of mono- and di-olefins with one another or with other vinyl monomers, such as, for example, ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another and with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternating or random polyalkylene-carbon monoxide copolymers and mixtures thereof with other polymers, such as, for example, polyamides.
4. Hydrocarbon resins (for example $C_5$–$C_9$) including hydrogenated modifications thereof (for example tackifier resins) and mixtures of polyalkylenes and starch.
5. Polystyrene, poly(p-methylstyrene), poly(α-methylstyrene).
6. Copolymers of styrene or α-methylstyrene with dienes or acrylic derivatives, such as, for example, styrene/butadiene, styrene/acrylonitrile, styrene/alkyl methacrylate, styrene/butadiene/alkyl acrylate and methacrylate, styrene/maleic anhydride, styrene/acrylonitrile/methyl acrylate; high-impact-strength mixtures consisting of styrene copolymers and another polymer, such as, for example, a polyacrylate, a diene polymer or an ethylene/propylene/diene terpolymer; and also block copolymers of styrene, such as, for example, styrene/butadiene/styrene, styrene/isoprene/styrene, styrene/ethylene-butylene/styrene or styrene/ethylene-propylene/styrene.

7. Graft copolymers of styrene or α-methylstyrene, such as, for example, styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, such as, for example, polychloroprene, chlorinated rubber, chlorinated and brominated copolymers of isobutylene/isoprene (halobutyl rubber) chlorinated or chlorosulfonated polyethylene, copolymers of ethylene and chlorinated ethylene, epichlorohydrin homo- and co-polymers, especially polymers of halogen-containing vinyl compounds, such as, for example, polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, such as, for example, acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide, or copolymers thereof with bisglycidyl ethers.

13. Polyacetals, such as polyoxymethylene, and also those polyoxymethylenes which contain comonomers, such as, for example, ethylene oxide; polyacetals that are modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxy groups on the one hand and aliphatic or aromatic polyisocyanates on the other hand, and their precursors.

16. Polyamides and copolyamides derived from diamines and dicarboxylic acids and/or from aminocarboxylic acids or the corresponding lactams, such as polyamide-4, polyamide-6, polyamide-6/6, -6/10, -6/9, -6/12, -46, -12/12, polyamide-11, polyamide-12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethyleneterephthalamide or poly-m-phenylene-isophthalamide. Block copolymers of the above-mentioned polyamides with polyolefins, olefin copolymers, ionomers or chemically bonded or grafted elastomers; or with polyethers, such as, for example, with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamideimides, polyetherimides, polyesterimides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers having terminal hydroxy groups; and also polyesters modified with polycarbonates or MBS.

19. Polycarbonates and polyester carbonates.

20. Polysulfones, polyether sulfones and polyether ketones.

A preferred group of thermoplastic polymers comprises halogen-containing polymers. Such polymers are preferably chlorine-containing polymers, such as, for example, polymers of vinyl chloride, vinyl resins, containing vinyl chloride units in their structure, copolymers of vinyl chloride and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or anhydrides thereof, copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and with other polymerisable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber hydrochloride and chlorinated rubber hydrochloride; and mixtures of the mentioned polymers with one another or with other polymerisable compounds. Also included are the graft polymers of PVC with EVA, ABS and MBS. Preferred substrates also include mixtures of the above-mentioned homo- and co-polymers, especially vinyl chloride homopolymers, with other thermoplastic and/or elastomeric polymers, especially blends with ABS, MBS, NBR, SAN, EVA, CPE, MBAS, PMA, PMMA, EPDM and polylactones.

Preference is given also to suspension and bulk polymers, as well as to emulsion polymers.

Especially preferred as chlorine-containing polymer is polyvinyl chloride, especially suspension and bulk polymer.

The chlorine-containing polymers preferably do not contain plasticisers.

Preference is given to a stabilised halogen-containing polymer, as described above, comprising at least one inorganic zinc compound, for example zinc oxide, hydroxide, chloride or sulfide or overbased zinc oxide/hydroxide addition compounds, or one organic zinc compound from the series of the saturated aliphatic $C_2$–$C_{22}$carboxylates, the unsaturated aliphatic $C_3$–$C_{22}$carboxylates, the aliphatic $C_2$–$C_{22}$carboxylates substituted by at least one OH group or the chain of which is interrupted by at least one oxygen atom (oxa acids), the cyclic and bicyclic carboxylates having from 5 to 22 carbon atoms, the phenyl carboxylates, unsubstituted or substituted by at least one OH group and/or substituted by $C_1$–$C_{16}$alkyl, the naphthyl carboxylates, unsubstituted or substituted by at least one OH group and/or substituted by $C_1$–$C_{16}$alkyl, the phenyl-$C_1$–$C_{16}$alkylcarboxylates, the naphthyl-$C_1$–$C_{16}$alkylcarboxylates and the unsubstituted or $C_1$–$C_{12}$alkyl-substituted phenolates.

The following may be mentioned specifically as examples: the zinc salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, 9,10-dihydroxystearic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid and sorbic acid; zinc salts of the monoesters of divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, polyglycol-dicarboxylic acid (n=10–12), phthalic acid, isophthalic acid, terephthalic acid and hydroxyphthalic acid; and of the di- or tri-esters of tri- or tetra-valent carboxylic acids, such as hemimellitic acid, trimellitic acid, pyromellitic acid and citric acid, and also zinc salts of mono- and di-esterified phosphoric acid or of monoesterified phosphorous acid, as described in JP 3 275 570.

Preference is given especially to an organic zinc carboxylate of a carboxylic acid having from 7 to 18 carbon atoms (zinc soaps), such as, for example, a benzoate or an alkanoate, preferably stearate, oleate, laurate, palmitate, behenate, hydroxystearates, dihydroxystearates or (iso) octanoate. Special preference is given to stearate, oleate, benzoate and 2-ethylhexanoate.

In addition to the zinc compounds mentioned, there also come into consideration inorganic and organic aluminium compounds, to which the details given above in relation to the zinc compounds apply. Further illustrations in respect of the aluminium compounds that can be used and that are preferred are disclosed in U.S. Pat. No. 4,060,512.

In addition to the zinc compounds mentioned, there also come into consideration inorganic and organic rare earth compounds, to which the details given above in relation to the zinc compounds apply. The expression "rare earth compound" is to be understood especially as compounds of the elements cerium, praseodymium, neodymium, samarium, europium, gadolinium, terbium, dysprosium, holmium, erbium, thulium, ytterbium, lutetium, lanthanum and yttrium, preference being given to mixtures especially with cerium. Further preferred rare earth compounds are disclosed in EP-A-0 108 023.

Optionally, a mixture of zinc, aluminium, lanthanum or lanthanoid compounds of different structures may be used. Also, organic zinc, aluminium, lanthanum or lanthanoid compounds can be coated onto a hydrotalcite, zeolite or dawsonite; see in that connection also DE-A-4 031 818.

The PVC stabilised according to the invention may also comprise further additives. The additives are, for example, inorganic or organic calcium or magnesium compounds, zeolites, hydrotalcites, dawsonites, magadiites, kenyaites, kanemites, 1,3-diketo compounds, polyols, nitrogen-containing compounds, e.g. β-aminocrotonates as mentioned in EP 0 465 405, page 6, lines 9–14, α-phenylindole, pyrroles, sterically hindered amines (HALS), dihydropyridines and their polymers, perchlorates, epoxides, phenolic anti-oxidants (HANDBOOK OF PVC FORMULATING E. J. Wickson John Wiley & Sons, Inc., 1993 pages 505–515), naphthols, thiophosphates, plasticisers (HANDBOOK OF PVC FORMULATING E. J. Wickson John Wiley & Sons, Inc., 1993 pages 163–303), fillers (HANDBOOK OF PVC FORMULATING E. J. Wickson John Wiley & Sons, Inc., 1993 pages 393–449) and reinforcing agents (TASCHENBUCH der Ka'e R. Gächter & H. Müller, Carl Hanser, 1990, pages 549–615) (such as, for example, calcium carbonate, magnesium oxide, magnesium hydroxide, silicates, glass fibres, talc, kaolin, chalk, mica, metal oxides and hydroxides, carbon black or graphite), phosphites, chelating agents (TASCHENBUCH der Ka'e R. Gächter & H. Müller, Carl Hanser, 1990, pages 109–131), light stabilisers, UV absorbers (HANDBOOK OF PVC FORMULATING E. J. Wickson John Wiley & Sons, Inc., 1993 pages 355–369), lubricants (HANDBOOK OF PVC FORMULATING E. J. Wickson John Wiley & Sons, Inc., 1993 pages 369–393), impact modifiers (IMPACT MODIFIERS FOR PVC J. T. LUTZ & D. L. DUNKELBERGER John Wiley & Sons, Inc., 1992) and processing aids (TASCHENBUCH der Ka'e R. Gächter & H.Müller, Carl Hanser, 1990, pages 505–524), fatty acid esters, paraffins, blowing agents (HANDBOOK OF PVC FORMULATING E. J. Wickson John Wiley & Sons, Inc., 1993 pages 525–551), fluorescent whitening agents (TASCHENBUCH der Ka'e R. Gächter & H. Müller, Carl Hanser, 1990, pages 807–821), gelling aids, colourants (HANDBOOK OF PVC FORMULATING E. J. Wickson John Wiley & Sons, Inc., 1993 pages 449–475), pigments (TASCHENBUCH der Ka'e R. Gächter & H. Müller, Carl Hanser, 1990, pages 663–735), flame retardants and smoke suppressants (HANDBOOK OF PVC FORMULATING E. J. Wickson John Wiley & Sons, Inc., 1993 pages 551–579), antistatics (HANDBOOK OF PVC FORMULATING E. J. Wickson John Wiley & Sons, Inc., 1993 pages 487–505), antifogging agents (HANDBOOK OF PVC FORMULATING E. J. Wickson John Wiley & Sons, Inc., 1993 pages 475–487), biocides, thiodipropionic acid and esters thereof, dialkyl disulfides (HANDBOOK OF PVC FORMULATING E. J. Wickson John Wiley & Sons, Inc., 1993 pages 515–525), mercaptocarboxylic acid esters, peroxide-destroying compounds, modifiers and further complexing agents for Lewis acids.

Further preferred thermoplastic polymers covered by the present invention are polyolefins, as described above under Points 1 to 3.

A group of preferred polymers are PVC, styrene, including its copolymers and graft copolymers, polycarbonate and blends of polycarbonate with polyesters and also polyphenylene oxide, as well as polyolefins.

Special preference is given to compositions that comprise as component a) a polyolefin or PVC. Polypropylene or polyethylene is more especially preferred.

When the thermoplastic polymers are recycled materials, special preference is given to polyolefins, such as polyethylene and polypropylene, and also to mixtures thereof in various compositions. Such mixtures comprise, for example, HDPE, LDPE with PP.

The epoxy compounds that can be used within the scope of the invention may have an aliphatic, aromatic, cycloaliphatic, araliphatic or heterocyclic structure; they contain epoxy groups as side groups. The epoxy groups are preferably in the form of glycidyl groups bound to the remainder of the molecule by way of ether or ester bonds, or are N-glycidyl derivatives of heterocyclic amines, amides or imides. Epoxy compounds of those types are generally known and are available commercially.

The epoxy compounds contain at least two epoxy radicals, especially radicals of formula II

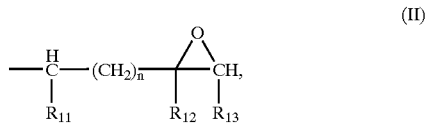

(II)

such radicals being bonded directly to carbon, oxygen, nitrogen or sulfur atoms, in which formula $R_{11}$ and $R_{13}$ are each hydrogen, $R_{12}$ is hydrogen or methyl and $n=0$, or $R_{11}$ and $R_{13}$ together are —$CH_2$—$CH_2$— or —$CH_2$—$CH_2$–$CH_2$—, in which case $R_{12}$ is hydrogen and n is 0 or 1. The following may be mentioned as examples of epoxy compounds:

I) Glycidyl and β-methylglycidyl esters obtainable by the reaction of a compound having at least one carboxy group in the molecule with epichlorohydrin or glycerol dichlorohydrin or β-methyl epichlorohydrin. The reaction is advantageously carried out in the presence of bases.

Aliphatic carboxylic acids may be used as compounds having at least one carboxy group in the molecule. Examples of such carboxylic acids include glutaric acid, adipic acid, pimelic acid, suberic acid, azelaic acid, sebacic acid, dimerised or trimerised linoleic acid, acrylic and methacrylic acid, caproic acid, caprylic acid, lauric acid, myristic acid, palmitic acid, stearic acid and pelargonic acid, and the acids mentioned in relation to the organic zinc compounds.

It is also possible, however, for cycloaliphatic carboxylic acids to be used, for example cyclohexanecarboxylic acid, tetrahydrophthalic acid, 4-methyltetrahydrophthalic acid, hexahydrophthalic acid or 4-methylhexahydrophthalic acid.

Aromatic carboxylic acids may also be used, for example benzoic acid, phthalic acid, isophthalic acid, trimellitic acid or pyromellitic acid.

Carboxy-terminated addition compounds, for example of trimellitic acid, and polyols, for example glycerol or 2,2-bis(4-hydroxycyclohexyl)propane, may also be used as well.

Further epoxy compounds that can be used within the scope of this invention are disclosed in EP 0 506 617.

II) Glycidyl or (β-methylglycidyl)ethers obtainable by the reaction of a compound having at least one free alcoholic hydroxy group and/or phenolic hydroxy group and a suitably substituted epichlorohydrin under alkaline conditions, or in the presence of an acid catalyst and subsequent alkali treatment.

Ethers of that type are derived, for example, from acyclic alcohols, such as ethylene glycol, diethylene glycol and higher poly(oxyethylene)glycols, propane-1,2-diol, or poly(oxy-propylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, bis-trimethylolpropane, pentaerythritol or sorbitol, and also from polyepichlorohydrins, butanol, amyl alcohol, pentanol, as well as from monofunctional alcohols, such as isooctanol, 2-ethylhexanol, isodecanol and also $C_7$–$C_9$alkanol and $C_9$–$C_{11}$alkanol mixtures.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis (hydroxymethyl)-cyclohex-3-ene, or they contain aromatic nuclei, such as N,N-bis(2-hydroxyethyl)aniline or p,p'-bis (2-hydroxyethylamino)diphenylmethane.

The epoxy compounds can also be derived from mononuclear phenols, for example from phenol, resorcinol or hydroquinone; or they are based on polynuclear phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenylsulfone or on condensation products of phenols with formaldehyde obtained under acidic conditions, such as phenol novolaks.

Further possible terminal epoxides include, for example: glycidyl-1-naphthyl ether, glycidyl-2-phenylphenyl ether, 2-biphenylglycidyl ether, N-(2,3-epoxypropyl)phthalimide and 2,3-epoxypropyl-4-methoxyphenyl ether.

III) (N-Glycidyl) compounds obtainable by dehydrochlorination of the reaction products of epichlorohydrin with amines that contain at least one amino hydrogen atom. Such amines are, for example, aniline, N-methylaniline, toluidine, n-butylamine, bis(4-aminophenyl)-methane, m-xylylenediamine and bis(4-methylaminophenyl)methane, but also N,N,O-triglycidyl-m-aminophenol and N,N,O-triglycidyl-p-aminophenol.

The (N-glycidyl) compounds also include, however, N,N'-di-, N,N',N"-tri- and N,N',N",N'''-tetra-glycidyl derivatives of cycloalkyleneureas, such as ethyleneurea or 1,3-propyleneurea, and N,N'-diglycidyl derivatives of hydantoins, such as of 5,5-dimethylhydantoin or glycoluril and triglycidyl isocyanurate.

IV) S-Glycidyl compounds, such as, for example, di-S-glycidyl derivatives that are derived from dithiols, for example ethane-1,2-dithiol or bis(4-mercaptomethylphenyl) ether.

V) Epoxy compounds having a radical of formula II wherein $R_1$ and $R_3$ together are —$CH_2$—$CH_2$— and n is 0 are bis(2,3-epoxycyclopentyl)ether, 2,3-epoxycyclopentylglycidyl ether or 1,2-bis(2,3-epoxycyclopentyloxy)ethane. An epoxy compound having a radical of formula II wherein $R_1$ and $R_3$ together are —$CH_2$–$CH_2$— and n is 1 is, for example, 3,4-epoxy-6-methyl-cyclohexanecarboxylic acid (3',4'-epoxy-6'-methyl-cyclohexyl)methyl ester.

The following are examples of suitable terminal epoxides:
a) liquid diglycidyl ethers of bisphenol A, such as Araldite®GY 240, Araldite®GY 250, Araldite®GY 260, Araldite®GY 266, Araldite®GY 2600, Araldite®MY 790;
b) solid diglycidyl ethers of bisphenol A, such as Araldite®GT 6071, Araldite®GT 7071, Araldite®GT 7072, Araldite®GT 6063, Araldite®GT 7203, Araldite®GT 6064, Araldite®GT 7304, Araldite®GT 7004, Araldite®GT 6084, Araldite®GT 1999, Araldite®GT 7077, Araldite®GT 6097, Araldite®GT 7097, Araldite®GT 7008, Araldite®GT 6099, Araldite®GT 6608, Araldite®GT 6609, Araldite®GT 6610;
c) liquid diglycidyl ethers of bisphenol F, such as Araldite®GY 281, Araldite®PY 302, Araldite®PY 306;

d) solid polyglycidyl ethers of tetraphenylethane, such as CG Epoxy Resin®0163;
e) solid and liquid polyglycidyl ethers of phenolformaldehyde novolak, such as EPN 1138, EPN 1139, GY 1180, PY 307;
f) solid and liquid polyglycidyl ethers of o-cresolformaldehyde novolak, such as ECN 1235, ECN 1273, ECN 1280, ECN 1299;
g) liquid glycidyl ethers of alcohols, such as Shell® glycidyl ether 162, Araldite®DY 0390, Araldite®DY 0391;
h) liquid glycidyl ethers of carboxylic acids, such as Shell®Cardura E terephthalic acid ester, trimellitic acid esters, Araldite®PY 284;
i) solid heterocyclic epoxy resins (triglycidyl isocyanurate), such as Araldite®PT 810;
j) liquid cycloaliphatic epoxy resins, such as Araldite®CY 179;
k) liquid N,N,O-triglycidyl ethers of p-aminophenol, such as Araldite®MY 0510;
l) tetraglycidyl-4,4'-methylenebenzamine or N,N,N',N'-tetraglycidyldiaminophenylmethane, such as Araldite®MY 720, Araldite®MY 721.

Preferably, epoxy compounds having two functional groups are used, but in principle it is also possible to use epoxy compounds having three or more functional groups. Mainly, diglycidyl compounds having aromatic structures, such as, for example, phenyl radicals, are used.

It is also possible, where appropriate, for a mixture of epoxy compounds of different structures to be used.

As polyfunctional epoxy compounds there are especially preferred diglycidyl ethers based on bisphenols, such as, for example, 2,2-bis(4-hydroxyphenyl)propane (bisphenol A), bis(4-hydroxyphenyl)methane or mixtures of bis(ortho-/para-hydroxyphenyl)methane (bisphenol F).

The polyfunctional epoxy compound b) is used preferably in an amount of from 0.01 to 10% by weight, based on the polymer, and more especially in an amount of from 0.1 to 5% by weight.

The imidazolidone compounds are used preferably in an amount of from 0.01 to 0.5% by weight, based on the polymer, and more especially in an amount of from 0.05 to 0.5% by weight.

Preference is given to those imidazolidones that are of low volatility at the processing temperature.

Preference is given to imidazolidone compounds of formula I

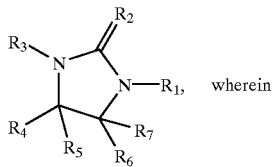

wherein $R_1$ and $R_3$ are each independently of the other H, $C_1$–$C_{18}$alkyl, or unsubstituted or $C_1$–$C_{12}$alkyl-, $C_1$–$C_{12}$alkoxy- or halo-substituted phenyl or $C_7$–$C_9$phenylalkyl;

$R_2$ is O or S;

$R_4$, $R_5$, $R_6$ and $R_7$ are each independently of the others H, $C_1$–$C_{18}$alkyl, or unsubstituted or $C_1$–$C_{12}$alkyl-, $C_1$–$C_{12}$alkoxy- or halo-substituted phenyl, $C_7$–$C_9$phenylalkyl, COOR$_8$ or C(O)R$_8$ and $R_8$ is H, $C_1$–$C_{18}$alkyl, benzyl or phenyl.

Halogen is fluorine, chlorine, bromine or iodine.

The $C_1$–$C_{18}$alkyl groups may be linear or branched and are, for example, methyl, ethyl, n-propyl, isopropyl, n-butyl, tert-butyl, pentyl, hexyl, heptyl, octyl, decyl, dodecyl or octadecyl.

$C_1$–$C_{12}$Alkoxy may be, for example, methoxy, ethoxy, butoxy, hexyloxy, heptyloxy, octyloxy or dodecyloxy.

$C_7$–$C_9$Phenylalkyl is preferably benzyl.

Alkyl-, alkoxy- or halo-substituted phenyl or phenylalkyl may be, for example, tolyl, xylyl, tert-butylphenyl, methoxyphenyl, ethoxyphenyl, chlorophenyl or dichlorophenyl or a correspondingly substituted benzyl derivative.

The compounds of formula I, depending on the various substituents, may occur in various stereoisomeric forms. All stereoisomers are included within the scope of the present invention.

Preference is given especially to compounds of formula I wherein $R_1$ and $R_3$ are each independently of the other H, $C_1$–$C_{18}$alkyl, phenyl or $C_7$–$C_9$phenylalkyl;

$R_2$ is O or S;

$R_4$, $R_5$, $R_6$ and $R_7$ are each independently of the others H, $C_1$–$C_{18}$alkyl, phenyl, $C_7$–$C_9$phenylalkyl or COOR$_8$ and $R_8$ is H, $C_1$–$C_4$alkyl or benzyl.

Preference is given more especially to compounds of formula I wherein $R_1$ and $R_3$ are each independently of the other H, $C_1$–$C_4$alkyl, phenyl or $C_7$–$C_9$phenylalkyl;

$R_2$ is O;

$R_4$, $R_5$, $R_6$ and $R_7$ are each independently of the others H, $C_1$–$C_{14}$alkyl, phenyl, $C_7$–$C_9$phenylalkyl or COOR$_8$ and $R_8$ is $C_1$–$C_4$alkyl or benzyl.

The compositions, especially those comprising a polyolefin, may also comprise further stabilisers and additives. Examples are listed hereinbelow 1. Anti-oxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl)-4,6-dimethylphenol, 2,6-di-octadecyl-4-methylphenol, 2,4,6-tricyclohexylphenol, 2,6-di-tert-butyl-4-methoxymethylphenol, linear nonylphenols or nonylphenols branched in the side chain, for example 2,6-di-nonyl-4-methylphenol; 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol, and mixtures thereof.

1.2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thio-bis(6-tert-butyl-4-methylphenol), 2,2'-thio-bis(4- octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxyphenyl)disulfide.

1.6. Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-($\alpha$-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-($\alpha$-methylbenzyl)-4-nonylphenol], 2,2'-methylene-bis[6-($\alpha,\alpha$-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicylopentadiene, bis[2-(3'-tert-butyl-2'-hydroxy-5'-methyl-benzyl)-6-tert-butyl-4-methylphenyl]terephthalate, 1,1-bis(3,5-dimethyl-2-hydroxyphenyl)butane, 2,2-bis(3,5-di-tertbutyl-4-hydroxyphenyl)propane,2,2-bis(5-tert-butyl-4-hydroxy-2-methylphenyl)-4-n-dodecylmercapto-butane, 1,1,5,5-tetra(5-tert-butyl-4-hydroxy-2-methylphenyl) pentane.

1.7. O-, N- and S-benzyl compounds, for example 3,5,3',5'-tetra-tert-butyl4,4'-dihydroxydibenzyl ether, octadecyl-4-hydroxy-3,5-dimethylbenzyl-mercaptoacetate, tridecyl-4-hydroxy-3,5-di-tert-butylbenzyl-mercaptoacetate, tris(3,5-di-tert-butyl-4-hydroxybenzyl)amine, bis(4-tert-butyl-3-hydroxy-2,6-dimethylbenzyl)dithioterephthalate,bis(3,5-di-tert-butyl-4-hydroxybenzyl)sulfide, isooctyl-3,5-di-tert-butyl-4-hydroxybenzyl-mercaptoacetate.

1.8. Hydroxybenzylated malonates, for example dioctadecyl-,2-bis(3,5-di-tert-butyl-2-hydroxybenzyl) malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, di-[4-(1,1,3,3-tetramethylbutyl)-phenyl]-2,2-bis(3,5-di-tert-butyl-4-hydroxybenzyl)malonate.

1.9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)-phenol.

1.10. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3,-triazine,1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine,1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.11. Benzyl phosphonates, for example dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoethyl ester.

1.12. Acylaminophenols, for example 4-hydroxylauric acid anilide, 4-hydroxystearic acid anilide, N-(3,5-di-tert-butyl-4-hydroxyphenyl)carbamic acid octyl ester.

1.13. Esters of β-(3,5-di-tert-butyl-4-hydroxyphenyl) propionic acid with mono- or poly-hydric alcohols, such as, for example, with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or poly-hydric alcohols, such as, for example, with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-,6,7-trioxabicyclo[2.2.2]octane.

1.16. Esters of 3,5-di-tert-butyl-4-hydroxyphenylacetic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid, such as, for example, N,N'-bis(3,5-di-tert-butyl-4-hydroxyphenylpropionyl)hexamethylene diamide, N,N'-bis(3,5-di-tert-butyl-4-hydroxyphenylpropionyl) trimethylene diamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard®XL-1 from Uniroyal).

1.18. Ascorbic acid (vitamin C).

1.19. Amine anti-oxidants, for example N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethylbutyl)-N'-phenyl-p-phenylenediamine, N-(1-methyl-heptyl)-N'-phenyl-p-phenylenediamine, N-cyclohexyl-N'-phenyl-p-phenylenediamine, 4-(p-toluene-sulfonamido)-diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine; 4-n-butylaminophenol, 4-butyrylamino-phenol, 4-nonanoylamino-phenol, 4-dodecanoylamino-phenol, 4-octadecanoylamino-phenol, di(4-methoxyphenyl)-amine, 2,6-di-tert-butyl-4-dimethylamino-methyl-phenol, 2,4'-diamino-diphenylmethane, 4,4'-diamino-diphenylmethane, N,N,N',N'-tetramethyl4,4'-diamino-diphenylmethane, 1,2-di[(2-methyl-phenyl)-amino]-ethane, 1,2-di(phenylamino)-propane, (o-tolyl)-biguanide, di-[4-(1',3'-dimethyl-butyl)-phenyl]amine, tert-octylated N-phenyl-1-naphthylamine, a mixture of mono- and di-alkylated tert-butyl/tert-octyl-diphenylamines, a mixture of mono- and di-alkylated nonyldiphenylamines, a mixture of mono- and di-alkylated dodecyldiphenylamines, a mixture of mono- and di-alkylated isopropyl/isohexyl-diphenylamines, mixtures of mono- and di-alkylated tert-butyl-diphenylamines, 2,3-dihydro-3,3-dimethyl-4H-1,4-benzothiazine, phenothiazine, a mixture of mono- and di-alkylated tert-butyl/tert-octyl-phenothiazines, a mixture of mono- and di-alkylated tert-octylphenothiazines, N-allylphenothiazine, N,N,N',N'-tetraphenyl-1,4-diaminobut-2-ene, N,N-bis(2,2,6,6-tetramethyl-piperidin-4-yl-hexamethylenediamine, bis(2,2,6,6-tetramethylpiperidin-4-yl)-sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)-benzotriazoles, such as, for example, 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)phenyl)-benzotrizole, 2-(3',5'-di-tert-butyl-2'-hydroxyphenyl)-5-chloro-benzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis($\alpha,\alpha$-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2-hydroxy-phenyl]-benzotriazole with polyethylene glycol 300;

[R—CH$_2$CH$_2$—COO—CH$_2$CH$_2$$\rightarrow_2$ in which R=3'-tert-butyl-4'-hydroxy-5'-2H-benzotriazol-2-yl-phenyl; 2-[2'-hydroxy-3'-($\alpha,\alpha$-dimethylbenzyl)-5'-(1,1,3,3-tetramethylbutyl)-phenyl]benzotriazole; 2-[2'-hydroxy-3'-(1,1,3,3-tetramethylbutyl)-5'-($\alpha,\alpha$-dimethylbenzyl)-phenyl]benzotriazole.

2.2. 2-Hydroxybenzophenones, such as, for example, the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

2.3. Esters of unsubstituted or substituted benzoic acids, such as, for example, 4-tert-butylphenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, such as, for example, $\alpha$-cyano-$\beta,\beta$-diphenylacrylic acid ethyl ester or isooctyl ester, $\alpha$-methoxycarbonyl-cinnamic acid methyl ester, $\alpha$-cyano-$\beta$methyl-p-methoxy-cinnamic acid methyl ester or butyl ester, $\alpha$-methoxycarbonyl-p-methoxy-cinnamic acid methyl ester, N-($\beta$-methoxycarbonyl-$\beta$-cyanovinyl)-2-methyl-indoline.

2.5. Nickel compounds, such as, for example, nickel complexes of 2,2'-thio-bis[4-(1,1,3,3-tetramethylbutyl) phenol], such as the 1:1 or 1:2 complex, optionally with additional ligands, such as n-butylamine, triethanolamine or N-cyclohexyl-diethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxy-pyrazole, optionally with additional ligands.

2.6. Sterically hindered amines, such as, for example, bis(2,2,6,6-tetramethyl-piperidin-4-yl) sebacate, bis(2,2,6,6-tetramethyl-piperidin-4-yl) succinate, bis(1,2,2,6,6-pentamethylpiperidin-4-yl) sebacate, bis(1-octyloxy-2,2,6,6-tetramethylpiperidin-4-yl) sebacate, n-butyl-3,5-di-tert-butyl-4-hydroxybenzyl-malonic acid bis(1,2,2,6,6-pentamethylpiperidyl)ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)-hexamethylenediamine and 4-tert-octylamino-2,6-dichloro-1,3,5-s-triazine, tris(2,2,6,6-tetramethyl-4-piperidyl)-nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, linear or cyclic condensation products of N,N'-bis(2,2,6,6-tetramethyl-4-piperidyl)-hexamethylene-diamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl4-piperidyl)pyrrolidine-2,5-dione, 3-dodecyl-1-(1,2,2,6,6-pentamethyl-4-piperidyl)-pyrrolidine-2,5-dione, a mixture of 4-hexadecyloxy- and 4-stearyloxy-2,2,6,6-tetramethylpiperidine, condensation product of N,N'-bis(2,2,6,6-tetramethyl-4-piperidyl)-hexamethylendiamine and 4-cyclohexylamino-2,6-dichloro-1,3,5-triazine, condensation product of 1,2-bis(3-aminopropylamino)-ethane and 2,4,6-trichloro-1,3,5-triazine and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)-ethene, N,N'-bis-formyl-N,N'-bis(2,2,6,6-tetramethyl-4-piperidyl)-hexamethylenediamine, diester of 4-methoxy-methylene-malonic acid with 1,2,2,6,6-pentamethyl-4-hydroxy-piperidine, poly[methylpropyl-3-oxy-4-(2,2,6,6-tetramethyl-4-piperidyl)]-siloxane, reaction product of maleic anhydride α-olefin copolymer and 2,2,6,6-tetramethyl-4-aminopiperidine or 1,2,2,6,6-pentamethyl-4-aminopiperidine.

2.7. Oxalic acid diamides, such as, for example, 4,4'-di-octyloxy-oxanilide, 2,2'-diethoxyoxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and a mixture thereof with 2-ethoxy-2'-ethyl-5,4'-di-tert-butyl-oxanilide, mixtures of o- and p-methoxy- and also of o- and p-ethoxy-di-substituted oxanilides.

2.8. 2-(2-Hydroxyphenyl)-1,3,5-triazines, such as, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]4,6-bis(2,4-dimethylphenyl)-1,3,5-triazine, 2-[2-hydroxy-4-(2-hydroxy-3-dodecyloxy-propoxy)phenyl]4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, such as, for example, N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)-hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetyl-adipic acid dihydrazide, N,N'-bis-salicyloyl-oxalic acid dihydrazide, N,N'-bis-salicyloyl-thiopropionic acid dihydrazide.

4. Phosphites and phosphonites, such as, for example, triphenyl phosphite, diphenylalkyl phosphites, phenyl-dialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecylpentaerythritol diphosphite, bis(2,4-di-tert-butylphenyl)-pentaerythritol diphosphite, bis(2,6-di-tert-butyl-4-methylphenyl)-pentaerythritol diphosphite, bis-isodecyloxy-pentaerythritol diphosphite, bis(2,4-di-tert-butyl-6-methylphenyl)-pentaerythritol diphosphite, bis(2,4,6-tri-tert-butylphenyl)-pentaerythritol diphosphite, tristearyl-sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl)methyl phosphite, bis(2,4-di-tert-butyl-6-methylphenyl)ethyl phosphite, 2,2',2"-nitrilo[triethyl-tris(3,3',5,5'-tetra-tert-butyl-1,1'-biphenyl-2,2'-diyl)phosphite], 2-ethylhexyl-(3,3',5,5'-tetra-tert-butyl-1,1'-biphenyl-2,2'-diyl)phosphite.

Special preference is given to the use of the following phosphites:

Tris(2,4-di-tert-butylphenyl)phosphite (Irgafos® 168, Ciba-Geigy), tris(nonylphenyl)phosphite,

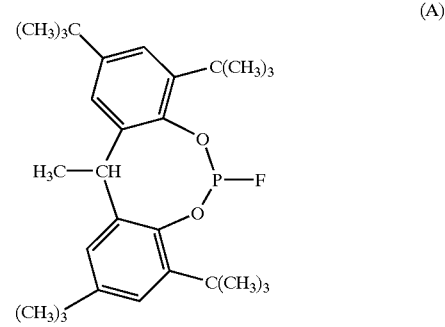

(A)

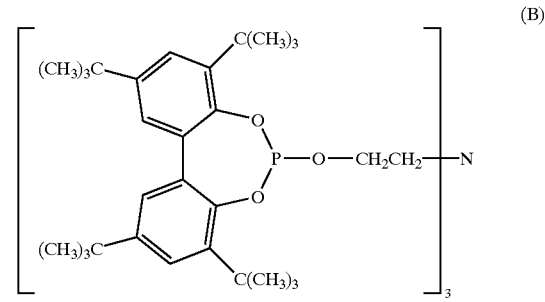

(B)

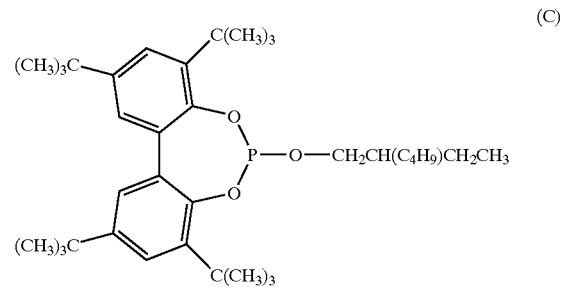

(C)

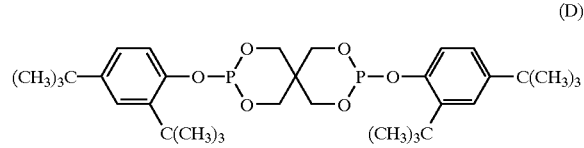

(D)

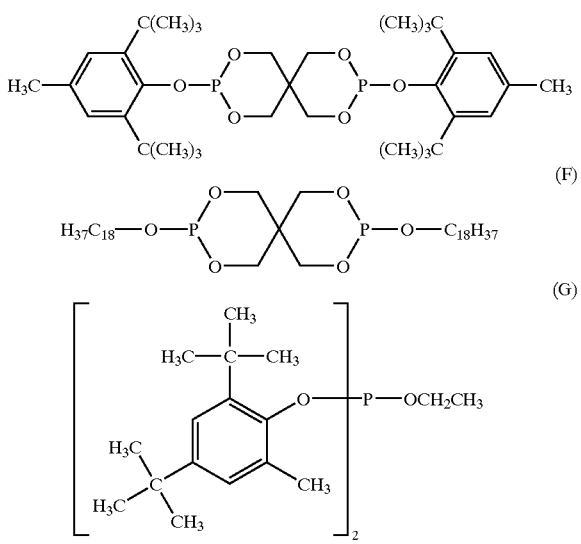

5. Hydroxylamines such as, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow fatty amines.

6. Nitrones such as, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alphatridecyl nitrone, N-hexadecyl-alpha-pentadecyl nitrone, N-octadecyl-alpha-heptadecyl nitrone, N-hexadecyl-alpha-heptadecyl nitrone, N-ocatadecyl-alpha-pentadecyl nitrone, N-heptadecyl-alpha-heptadecyl nitrone, N-octadecyl-alpha-hexadecyl nitrone, nitrones derived from N,N-dialkylhydroxylamines obtained from hydrogenated tallow fatty amines.

7. Thiosynergistic compounds, such as, for example, thiodipropionic acid dilauryl ester or thiodipropionic acid distearyl ester.

8. Peroxide-destroying compounds, such as, for example, esters of β-thiodipropionic acid, for example the lauryl, stearyl, myristyl or tridecyl ester, mercaptobenzimidazole, the zinc salt of 2-mercaptobenzimidazole, zinc dibutyl dithiocarbamate, dioctadecyldisulfide, pentaerythritol tetrakis(β-dodecylmercapto)propionate.

9. Polyamide stabilisers, such as, for example, copper salts in combination with iodides and/or phosphorus compounds and salts of divalent manganese.

10. Basic co-stabilisers, such as, for example, melamine, polyvinylpyrrolidone, dicyan-diamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, such as, for example, inorganic substances such as, for example, talc, metal oxides, such as titanium dioxide or magnesium oxide, phosphates, carbonates or sulfates of preferably alkaline earth metals; organic compounds such as mono- or polycarboxylic acids and their salts, such as, for example, 4-tert-butylbenzoic acid, adipic acid, diphenylacetic acid, sodium succinate or sodium benzoate; polymeric compounds such as, for example, ionic copolymers ("ionomers").

12. Fillers and reinforcing agents, such as, for example, calcium carbonate, silicates, glass fibres, glass beads, talc, kaolin, mica, barium sulfate, metal oxides and hydroxides, carbon black, graphite, wood flour and other natural products in powder or fibre form, synthetic fibres.

13. Other additives, such as, for example, plasticisers, lubricants, emulsifiers, pigments, rheology-improving additives, catalysts, flow improvers, fluorescent whitening agents, flame retardants, antistatics, blowing agents.

14. Benzofuranones and indolinones, as described, for example, in U.S. Pat. Nos. 4,325,863, 4,338,244, 5,175,312, 5,216,052, 5,252,643, DE-A-4316611, DE-A4 316 622, DE-A-4 316 876, EP-A-0 589 839 or EP-A-0 591 102, or 3-[4-(2-acetoxy-ethoxy)phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The present invention relates also to a method of improving the gloss of thermoplastic polymers, which comprises adding to the polymers during processing
  a) at least one polyfunctional epoxy compound and
  b) at least one imidazolidone compound,
  and melting, homogenising and further processing the mixture. The meanings and preferred meanings for the individual components are indicated above.

Preferably, the processing temperature is from 180° C. to 280° C.

The thermoplastic polymer according to the invention can be prepared in a manner known per se, the mentioned stabilisers and optionally further additives being admixed with the thermoplastic polymer using devices known per se, such as calenders, mixers, kneaders, extruders and the like.

The thermoplastic polymer prepared according to the present invention can subsequently be brought into the desired form by known methods. Such methods are, for example, calendering, extrusion, injection moulding, sintering or spinning, and also blow extrusion or rotational moulding.

The thermoplastic polymer stabilised in accordance with the invention is suitable especialy for hollow articles (bottles), packaging films (deep-drawn films), blown films, tubes, foamed materials, profiles (window frames, profiles for illuminated walls, building profiles), sidings, fittings, acetates, automobile components and apparatus housings (computers, household appliances).

The invention relates also to thermoplastic polymers with improved gloss comprising at least one polyfunctional epoxy compound and at least one imidazolidone compound.

The invention relates also to the use of a composition comprising at least one polyfunctional epoxy compound and at least one imidazolidone compound for improving the gloss of thermoplastic polymers.

The following Examples illustrate the invention.

Examples 1 and 2

Recycled polyolefinic material, consisting of HDPE, LDPE and PP, is combined with the additives mentioned in Table 1, at a maximum temperature of 210° C., using a single-screw extruder. Test specimens are then produced by injection moulding and the surface gloss of the specimens is measured according to DIN 67530 (60° observation angle). The results are shown in Table 1.

TABLE 1

| Example No. | Additive | 60° gloss value (%) |
|---|---|---|
| control specimen | — | 18–26 |
| 1 | 0.5% Araldite GT 7072<br>0.05% 2-imidazolidone (1) | 45 |
| 2 | 0.5% Araldite MY 790<br>0.05% 2-imidazolidone (1) | 40–55 |

Example 3

A PVC composition is prepared by mixing the individual components according to Table 2. For that purpose the components are homogenised at 200° C. for 5 minutes using a mixing mill and rolled out to form a film 0.3 mm thick.

The long-term stability is determined by a static heating test according to DIN 53381, in which the specimen is stored at 190° C. in a circulating air oven and the time taken for it to turn black is determined.

The gloss is determined according to DIN 67530 at an observation angle of 60°.

TABLE 2

| Composition | V1 | V2 | V3 | Unit |
|---|---|---|---|---|
| S-PVC (K value 65–68) | 100 | 100 | 100 | parts |
| chalk (omyalite 95T) | 2 | 2 | 2 | parts |
| organic stabilisers | 3.9 | 3.9 | 3.9 | parts |
| 2-imidazolidone (1) | — | 0.1 | 0.1 | parts |
| Araldite GY 250 | — | — | 2 | parts |
| static heating test | 39 | 39 | 39 | minutes |
| improvement in gloss value | reference | 0 | 64 | % |

PVC: Norvinyl S 6775

| Organic stabilisers: | |
|---|---|
| calcium stearate | 0.8 part |
| 6-amino-1,3-dimethyl-uracil | 0.2 part (Knoll AG) |
| Alkamizer I | 1.0 part (Kyowa Ind.) |
| Maltitol | 0.4 part (Cerestar Ind.) |
| Irgawax 367 | 0.7 part (Ciba Spezialitätenchemie) |
| wax PE 520 | 0.6 part (Hoechst) |
| AC 629 A | 0.2 part (Allied Chemicals) |

2-imidazolidone (1) 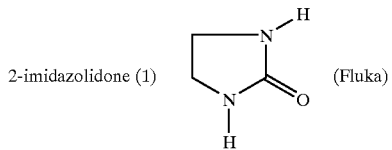 (Fluka)

What is claimed is:

1. A polymer composition comprising
   a) a thermoplastic polymer,
   b) at least one polyfunctional epoxy compound and
   c) at least one imidazolidone compound.

2. A composition according to claim 1, comprising PVC, styrene or one of its copolymers or graft copolymers, polycarbonate or a blend of polycarbonate with polyesters as well as polyphenylene oxide or a polyolefin.

3. A composition according to claim 1 that comprises as component a) a polyolefin or PVC.

4. A composition according to claim 1 that comprises as component a) polypropylene or polyethylene.

5. A composition according to claim 1 that comprises a recycled thermoplastic polymer material.

6. A composition according to claim 1, wherein the polyfunctional epoxy compound b) is present in an amount of from 0.01 to 10% by weight, based on the polymer.

7. A composition according to claim 1, wherein the imidazolidone is present in an amount of from 0.01 to 0.5% by weight, based on the polymer.

8. A composition according to claim 1, wherein the polyfunctional epoxy compounds are selected from the group of the diglycidyl ethers based on bisphenols.

9. A composition according to claim 6, wherein the polyfunctional epoxy compounds are diglycidyl ethers based on 2,2-bis(4-hydroxyphenyl)-propane (bisphenol A), bis(4-hydroxyphenyl)-methane or mixtures of bis(ortho/para-hydroxyphenyl)-methane (bisphenol F).

10. A composition according to claim 1, wherein the imidazolidone compound is a compound of formula I

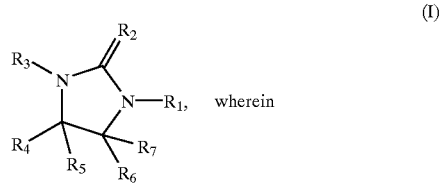

$R_1$ and $R_3$ are each independently of the other H, $C_1$–$C_{18}$alkyl, or unsubstituted or $C_1$–$C_{12}$-alkyl-, $C_1$–$C_{12}$alkoxy- or halo-substituted phenyl or $C_7$–$C_9$phenylalkyl;

$R_2$ is O or S;

$R_4$, $R_5$, $R_6$ and $R_7$ are each independently of the others H, $C_1$–$C_{18}$alkyl, or unsubstituted or $C_1$–$C_{12}$alkyl-, $C_1$–$C_{12}$alkoxy- or halo-substituted phenyl, $C_7$–$C_9$phenylalkyl, $COOR_8$ or $C(O)R_8$ and $R_8$ is H, $C_1$–$C_{18}$alkyl, benzyl or phenyl.

11. A composition according to claim 9, wherein in formula I $R_1$ and $R_3$ are each independently of the other H, $C_1$–$C_{18}$alkyl, phenyl or $C_7$–$C_9$phenylalkyl;

$R_2$ is O or S;

$R_4$, $R_5$, $R_6$ and $R_7$ are each independently of the others H, $C_1$–$C_{18}$alkyl, phenyl, $C_7$–$C_9$-phenylalkyl or $COOR_8$ and $R_8$ is H, $C_1$–$C_4$alkyl or benzyl.

12. A composition according to claim 10, wherein in formula I $R_1$ and $R_3$ are each independently of the other H, $C_1$–$C_4$alkyl, phenyl or $C_7$–$C_9$phenylalkyl;

$R_2$ is O;

$R_4$, $R_5$, $R_6$ and $R_7$ are each independently of the others H, $C_1$–$C_4$alkyl, phenyl, $C_7$–$C_9$-phenylalkyl or $COOR_8$ and $R_8$ is $C_1$–$C_4$alkyl or benzyl.

13. A method of improving the gloss of thermoplastic polymers, which comprises adding to the polymers during processing
   a) at least one polyfunctional epoxy compound and
   b) at least one imidazolidone compound,
   and melting, homogenising and further processing the mixture.

14. A method of improving gloss according to claim 11, wherein the processing temperature is from 180° C. to 280° C.

15. A thermoplastic polymer with improved gloss, comprising at least one polyfunctional epoxy compound and at least one imidazolidone compound.

* * * * *